(No Model.)
J. W. PEARSON.
HORSE COLLAR.
No. 274,966. Patented Apr. 3, 1883.
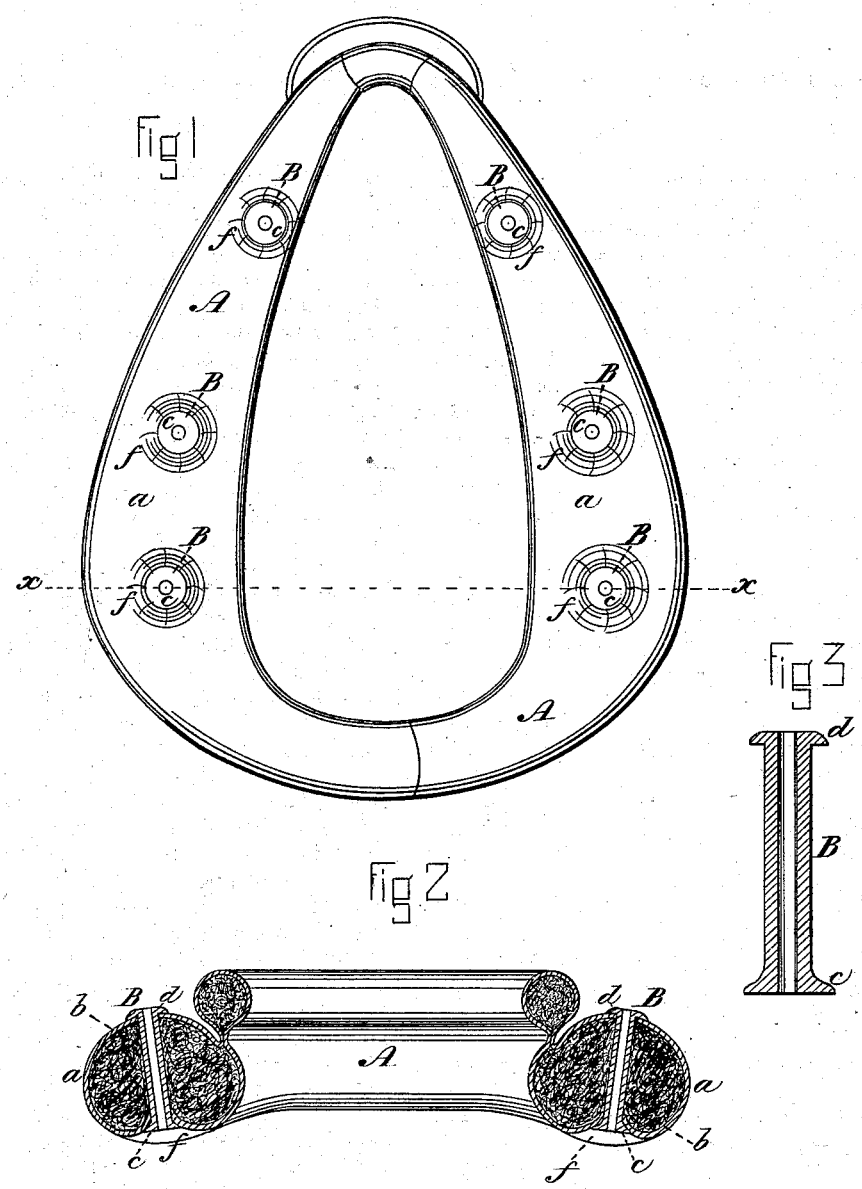
WITNESSES
W. J. Cambridge
H. A. Putnam
INVENTOR
Joseph W. Pearson
per F. C. Teschemacher
Atty

UNITED STATES PATENT OFFICE.

JOSEPH W. PEARSON, OF NEWTON, MASSACHUSETTS.

HORSE-COLLAR.

SPECIFICATION forming part of Letters Patent No. 274,966, dated April 3, 1883.

Application filed August 12, 1882. (No model.)

*To all whom it may concern:*

Be it known that I, JOSEPH W. PEARSON, a citizen of the United States, residing at Newton, in the county of Middlesex and State of Massachusetts, have invented certain Improvements in Horse-Collars, of which the following is a full, clear, and exact description, reference being had to the accompanying drawings, making part of this specification, in which—

Figure 1 is a rear elevation of a horse-collar having my improvements applied thereto. Fig. 2 is a transverse section through the same on the line $x$ $x$ of Fig. 1. Fig. 3 is a section through one of the ventilating air-tubes, enlarged.

Stuffed horse-collars as ordinarily constructed are objectionable, for the reason that the friction and pressure produced thereby upon the horse's shoulders while drawing the load cause undue heat and sweating at these points, which result in the skin becoming chafed and galled, and the animal is in this manner oftentimes rendered unfit for work, thus entailing considerable loss.

My invention has for its object to overcome these difficulties; and it consists in a stuffed horse-collar provided with open-end ventilating air-tubes extending transversely through it for the purpose of conducting and introducing the external air between the inner side of the collar and that portion of the skin of the horse against which it rests or bears, which is thus kept cool and all irritation allayed, thereby preventing the formation of sores, which are a source of great annoyance, and frequently deprive the owner of a horse of his use for a considerable length of time; and my invention also consists in certain details of construction, as hereinafter set forth and specifically claimed.

In the said drawings, A represents a stuffed horse-collar of the usual form. Transversely through those portions of the sides $a$ of the collar which bear against the shoulders of the horse and press hardest thereon during the draft are formed a series of apertures, $b$, within each of which is inserted a soft or flexible open-end tube, B, preferably composed of vulcanized rubber. These open-end tubes are provided at their opposite ends with flanges $c$ $d$, the former, $c$, enabling the covering on the inner side of the collar to be drawn inward to produce a hollow or depression, $f$, in which the inner end of the tube is seated, in order that it may lie below the level of the surrounding surface of the collar, and be thereby prevented from coming into contact with and abrading or chafing the skin of the horse. The outer flange, $d$, which, by reason of the soft or flexible nature of the material of which the tube is composed, can be compressed, to allow of its being drawn through its aperture $b$ in the collar, serves, when in contact with the outer surface of the collar, as seen in Fig. 2, to hold the tube securely in place with the inner end seated in the hollow $f$, beneath the level of the surrounding surface of the collar, as above described. The tubes B, through which the air passes freely, thus serve as ventilators or conductors for introducing the external air between the inner side of the collar and the shoulders of the horse, against which it bears, the free passage of the air to that portion of the skin beneath the collar, and its circulation thereunder, serving to keep the parts cool, avoid sweating and chafing, and allay any irritation of the skin, thus effectually preventing the formation of blisters and sores, which so frequently render a horse unfit for use where the ordinary collar is employed.

The collar may be provided with any desired number of these ventilating air-tubes B, located at suitable points, and although I prefer to make the tubes entirely of a soft or flexible substance the outer portion may, if desired, be composed of metal or other rigid material and the inner portion of rubber or other suitable flexible substance. The entire tube should not, however, be made of a rigid material, for the reason that when the collar becomes flattened or condensed from long use the inner end of the tube would be liable to project from the surface of the collar and chafe or injure the animal.

My improved ventilating-tubes may be applied to new or old collars at a trifling cost, and by this means much needless suffering and cruelty may be avoided, as well as the loss often occasioned by a horse becoming seriously injured and laid up as unfit for work.

I am aware that heretofore horse-collars have been made of wood and other materials, with numerous perforations to make the collar light and elastic, and such collars provided with a leather covering. I am also aware that perforated rubber tubing has heretofore been matted to form harness-pads, and hence I distinctly disclaim such devices; but

What I claim as my invention, and desire to secure by Letters Patent, is—

1. A horse-collar provided with one or more flexible ventilating open-end air-tubes extending through its body for the purpose of conducting or introducing air between the inner side of the collar and the shoulders of the horse in contact therewith, substantially as described.

2. The combination, with a horse-collar, of the flexible ventilating open-end air-tubes B, provided with flanges $c\,d$ for the purpose of holding them in place with their inner ends below the level of the surrounding surface of the collar, substantially as described.

Witness my hand this 10th day of August, A. D. 1882.

JOSEPH W. PEARSON.

In presence of—
P. E. TESCHEMACHER,
W. J. CAMBRIDGE.